Jan. 16, 1962     W. E. SIMON     3,016,745
TEMPERATURE PROBE
Filed Sept. 21, 1960
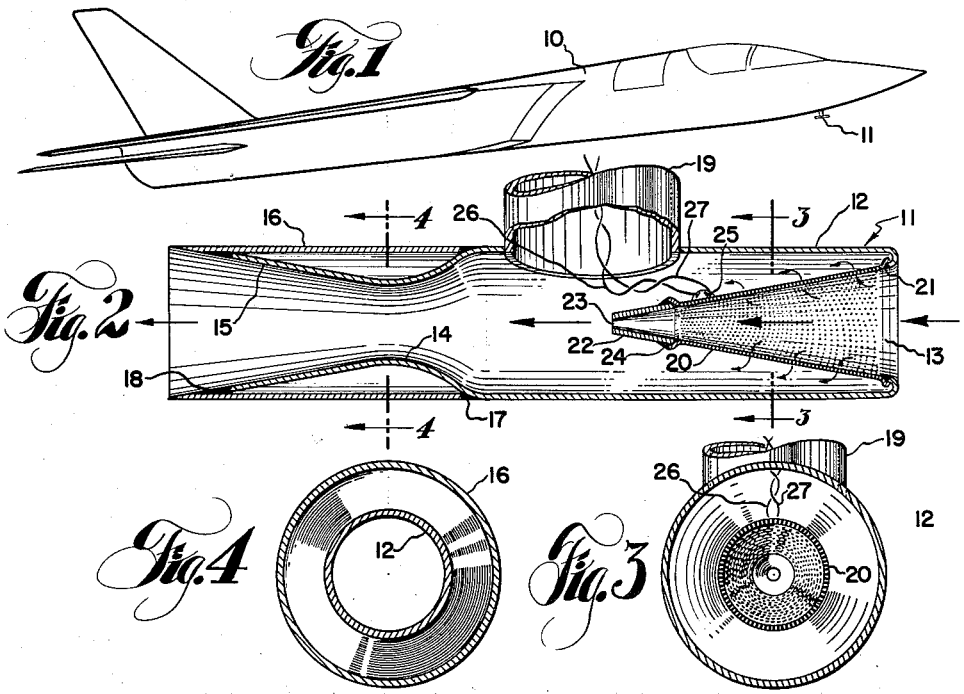
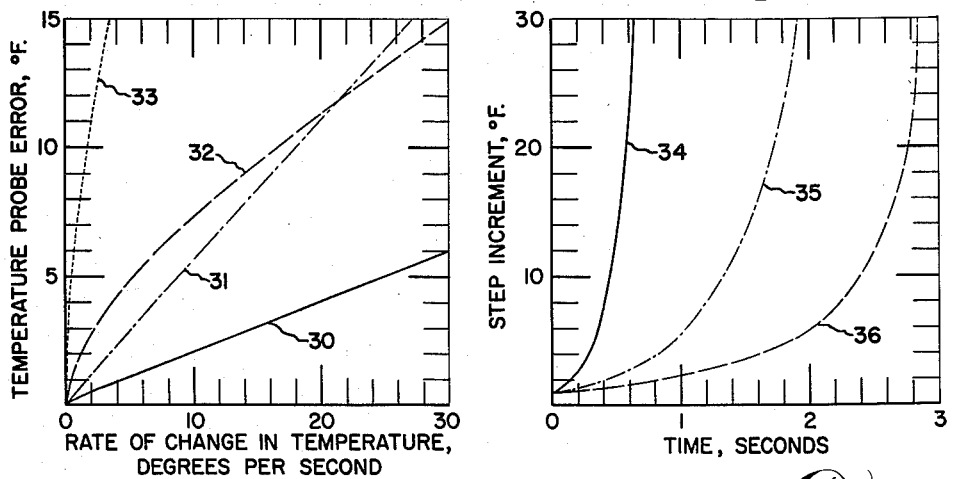
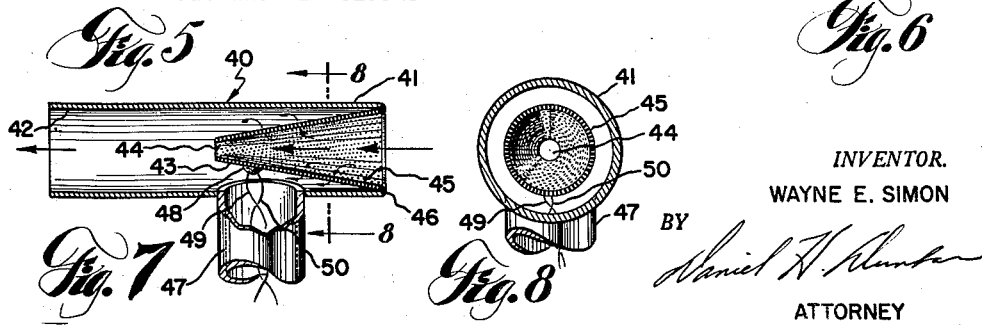
*INVENTOR.*
WAYNE E. SIMON
ATTORNEY

United States Patent Office 3,016,745
Patented Jan. 16, 1962

3,016,745
TEMPERATURE PROBE
Wayne E. Simon, Columbus, Ohio, assignor to
North American Aviation, Inc.
Filed Sept. 21, 1960, Ser. No. 57,587
14 Claims. (Cl. 73—349)

This invention relates to a temperature probe and more particularly concerns an improved means for detecting or sensing the total temperature of an airstream. The invention described herein obtains important advantages with respect to the detection and measurement of airstream total temperatures associated with high-speed aircraft flight operation, blow-down wind tunnel operations, the operation of jet-type engines, and like applications.

An important object of this invention is to provide a temperature probe having an improved response capability with respect to the detection and measurement of changing airstream total temperatures.

Another object of this invention is to provide a temperature probe having an improved error reduction capability with respect to the detection and measurement of changing airstream total temperatures.

Another object of my invention is to provide a temperature probe which has a theoretical recovery of one in connection with the detection and measurement of a changing airstream total temperature.

Another object of this invention is to provide a probe for detecting and sensing changing airstream total temperatures and which obtains improved response and error reduction capabilities without having a criticality associated with the mass of the temperature-sensing portion of the device.

A still further object of this invention is to provide an airstream total temperature probe which may be utilized to obtain improved temperature detection and measurement in connection with gas flows in various types of engines.

Another object of this invention is to provide a temperature probe construction which is suitable for exactly measuring the total temperature of a fluid stream in a manner which is entirely independent of the Prantl number of the fluid.

Another object of this invention is to provide a total temperature probe which may be conveniently and economically manufactured, which may be easily maintained, and which operates with an improved reliability.

Other objects and advantages of this invention will become apparent during consideration of the description and drawings.

In the drawings:

FIG. 1 illustrates an air vehicle having the temperature probe of this invention combined therewith;

FIG. 2 is a longitudinal sectional view of a preferred embodiment of this invention;

FIG. 3 is a sectional view taken at line 3—3 of FIG. 2;

FIG. 4 is a sectional view taken at line 4—4 of FIG. 2;

FIG. 5 provides a graphic comparison of the error reduction capability associated with the temperature probe of FIG. 2 in comparison to the error performance of known total temperature probes;

FIG. 6 provides a graphic illustration of the response capability of the temperature probe of my invention in comparison to the response capabilities associated with conventional total temperature probes;

FIG. 7 is a longitudinal sectional view of another embodiment of the temperature probe of this invention which may be advantageously utilized in connection with various engine applications; and FIG. 8 is a sectional view taken at line 8—8 of FIG. 7;

FIG. 1 illustrates a modern high performance aircraft 10 having the temperature probe assembly 11 of this invention combined therewith. Assembly 11 is provided for use in detecting and sensing the total temperature of the airstream which is environmental to aircraft 10 within its flight operations envelope. In general, the surrounding airstream will vary significantly in temperature within the flight envelope of air vehicle 10. Further, in typical aircraft applications the air vehicle may have a supersonic capability. Other applications for temperature probe assembly include subsonic aircraft operations, missile flights, wind tunnel operations, and the like.

Probe assembly 11 includes the exterior shell 12 which has a forwardly located inlet opening 13, a converging-diverging throat portion 14, and an outlet opening designated 15. A fairing sleeve member 16 is connected to shell member 12 by solder joints 17 and 18 to improve the external aerodynamic characteristics of the assembly. The assembly also includes tubular stem member 19 for connecting shell member 12 to an associated support structure such as airplane 10.

Assembly 11 is also provided with the perforated bleed member 20 which is located interiorly of shell 12 and which is connected to the assembly in the region of inlet opening 13 by the solder joint designated 21. Perforated bleed member 20 is preferably cone-shaped and is provided with an attached cone-shaped, imperforate terminating section 22 having an exit opening designated 23. A solder joint 24 may be employed to connect terminating section 22 to bleed member 20. A conventional thermocouple junction (not shown) is attached to the assembly at the surface of bleed member 20 by the minimum-mass connection designated 25. Although shown as a small solder joint, minimum-mass connection 25 may comprise a weld or other fused connection. The thermocouple junction is developed by joining the end portions of dissimilar thermocouple lead elements 26 and 27.

Throat portion 14 of exterior shell member 12 and interiorly-located bleed member 20 should each be designed so that the flow of airstream air through assembly 11 be of uniform velocity throughout the length of bleed member 20 and so that all normal shock wave systems are located exterior to that region. Bleed member 20 is preferably fabricated of a metallic material having good thermal conductivity and is provided with a sufficient number of properly sized uniformly spaced-apart bleed perforations as will be hereinafter detailed. In general, the materials used in connection with the fabrication of assembly 11 are not critical but must be compatible with the intended environment in which the assembly will be used. For instance, contemplated high-temperatures may require that temperature probe assembly 10 be manufactured of stainless steel or the like. Airflow through assembly 11 is illustrated in FIG. 2 by the various arrows.

Bleed member 20 comprises the temperature-sensing portion of probe assembly 11 and is provided in a form which has theoretical rate of recovery of 100%. Such theoretical recovery has been verified in practice and is supported analytically by asymptotic solution of the compressible boundary layer equation for a flat porous plate with uniform suction. The generalized philosophy of the temperature probe construction described herein is to establish an improved coefficient of heat transfer as between a perforated or porous bleed member and the sampled airstream portion to thereby permit rapid and accurate measurement of airstream total temperature by direct temperature measurement of the bleed member itself. The advantages of my invention are essentially achieved by increasing the friction between airstream sample and the perforated bleed member through improved boundary layer bleed techniques. In this manner, the temperature probe of this invention can utilize a greater and non-critical mass in the temperature-sensing portion of the unit without disturbing the obtained response and recovery characteristics. FIGS. 5 and 6 illustrate the error reduction and response capabilities of the total temperature probe illustrated in FIGS. 2 through 4 in comparison to similar characteristics developed in state-of-the-art airstream temperature probes.

The performance graphed by line 30 of FIG. 5 and by line 34 of FIG. 6 relates to observations obtained in an evaluation of a total temperature probe assembly fabricated in accordance with the construction of FIG. 2. Such probe assembly, which provides for three-dimensional airflow therethrough, included a perforated bleed member fabricated of thin metallic brass material having an approximate thickness of 0.01". The bleed member was characterized by 30% porosity, included approximately 1000 perforations per square inch of inner or outer surface area, and had a half-angle of 10° with respect to the longitudinal axis of exterior shell member 12. The unit was evaluated in connection with an airstream having a velocity of Mach number 0.9, a standard air density corresponding to 40" of mercury, and a changing airstream total temperature centered in the region of approximately 540° R. (80° F.). The airstream sample core velocity was approximately 308 feet per second (Mach number 0.27) within bleed member 20 and the velocity of bleed air passed through the perforations of bleed member 20 was approximately 20 feet per second. In general, the velocity of the bleed air moved through or across the wall of member 20 is kept small in comparison to the velocity of the total quantity of air flowed through the probe assembly. Although bleed member 20 is illustrated as being fabricated of thin metallic sheet-like perforated stock, this component may alternately be fabricated of a sintered metal having a similar degree of porosity.

Referring particularly to FIG. 5, the error reduction capability associated with the probe of my invention in its three-dimensional configuration is plotted along line 30. The associated degree of error is substantially less than that illustrated by curves 31 through 33. Curve 31 relates to data obtained in the evaluation of a probe assembly having the porous bleed member feature of this invention but utilizing two-dimensional airflow rather than the three-dimensional airflow disclosed in connection with the arrangement of FIG. 2. Curve 32 illustrates the performance error measured in connection with a high-quality, state-of-the-art probe unit having an electrical resistance type sensor. Curve 33 illustrates the error measured in connection with a state-of-the-art probe unit which has a thermocouple junction immersed in an essentially stagnated airstream sample. Comparable error-reduction advantages are also realized by this invention when compared to other types of temperature probes such as those which have a thermocouple junction connected to a low-mass plate member having the airstream sample impinged thereupon. As noted in connection with FIG. 5, the error reduction characteristic obtained by the probe assembly 11 in connection with the sensing and measurement of substantial rates of temperature change is very significant.

The response characteristic developed in connection with this invention is compared with the response characteristic of a typical high-quality state-of-the-art probe in FIG. 6. The hereinbefore-described probe assembly 11 (having three-dimensional airflow) has the response plotted along curve 34. In FIG. 6, stabilization time in seconds is plotted against various increments of airstream temperature change, each taken in connection with stabilization for 1° F. error. The evaluations were made in connection with a surrounding airstream having a Mach number 0.7. Curve 36 delineates the response characteristic of a total temperature assembly fabricated in accordance with this invention but having only two-dimensional airflow as to the airstream sample. The response characteristic presented by curve 36 relates to the state-of-the-art temperature probe unit evaluated in connection with curve 32 of FIG. 5. In general, the advantages obtained with this invention are most significant with respect to temperature measurements involving fluid streams having a relative velocity of approximately Mach number 0.3 or greater.

An alternate embodiment of the temperature probe of this invention is illustrated in FIGS. 7 and 8. The probe assembly 40 detailed therein is well-suited for use in connection with the measurement of exhaust gases and the like existing within aft sections of a turbo-jet type aircraft engine. The details disclosed in FIGS. 7 and 8 relate to a unit having a small size to permit installation within an operating engine without adversely affecting engine performance. The simplified design provided in connection with probe assembly 40 sacrifices a degree of uniformity of rate of gas flow through the porous bleed member by omitting a terminal section 22 (FIG. 2) from the construction but does obtain excellent error reduction and response capabilities in comparison to known temperature probe units utilized in similar high-temperature applications. As disclosed in FIGS. 7 and 8, assembly 40 includes cylindrically-shaped shell 41 having an exhaust opening 42. Perforated bleed member 43 is located interiorly of shell 41, has an exit opening 44, and is attached to the inlet region 45 of shell 41 by the fused joint designated 46. Tubular stem 47 is provided for attaching the probe assembly to an adjacent support. As in the case of probe assembly 11, the hollow interior of the tubular stem is used to contain the thermocouple leads and to route such leads to the measurement instrumentation contained within the air vehicle or other operating component. Porous member 43 has a form generally corresponding to bleed member 20 and has a conventional thermocouple junction (not shown) attached to its outer surface by the minimum-mass connection designated 48. Thermocouple leads 49 and 50 are similar to the leads designated 26 and 27 in FIG. 2. It is preferred that assembly 40 be fabricated of a heat and corrosion-resistant material such as stainless steel or the like. All components contained in the assembly should be fabricated of a material compatible with the environment in which the assembly is to be used.

It should be emphasized that the probe assembly of my invention does not depend upon the measurement of the temperature of a stagnated or nearly-stagnated airstream sample. Nor does this invention utilize a technique wherein a thermocouple type element is employed to directly measure the temperature of the air in which it is immersed. Further, this invention does not contemplate apparatus wherein the changes in electrical resistance of an element immersed in a passing airstream sample are utilized to indicate the temperature of the passing airstream. Instead, the technique employed in this invention involves the temperature measurement of a porous bleed member element which has a temperature that essentially corresponds to the total temperature of the airstream sampled by the probe assembly.

It is to be understood that the forms of the invention herein shown and described are to be taken as preferred embodiments of the same, but that various changes in the shape and size of parts may be resorted to without departing from the spirit of the invention or the scope of the subjoined claims.

I claim:
1. A temperature probe assembly which includes, in combination: a shell member having an inlet opening for obtaining a fluid stream sample, porous bleed means contained within said shell member in cooperating relation with said inlet opening, and thermocouple means operatively connected to said porous bleed means, said thermocouple means contacting said bleed means in temperature-sensing relation thereto.

2. The temperature probe assembly defined in claim 1, wherein a converging-diverging throat means is contained in said shell member in downstream relation to said bleed means, said converging-diverging throat means serving to position normal shock systems associated with the probe assembly outside the region of said porous bleed means.

3. The temperature probe assembly defined in claim 1, wherein said bleed means includes a porous surface contiguous to said shell member inlet opening and includes an exit opening downstream of said porous surface, said porous surface and said exit opening developing three-dimensional fluid flow within said shell member with respect to fluid received by the probe assembly through said shell member inlet opening.

4. The temperature probe assembly defined in claim 1, wherein said bleed means includes a porous element contiguous to said shell member inlet opening and includes a terminating section joined to said porous element and having an exit opening provided therein in downstream relation to said shell member inlet opening, said terminating section establishing a substantially uniform flow velocity with respect to fluid received by the probe assembly through said shell member inlet opening and flowed along the longitudinal axis of said bleed means throughout the region between said shell member inlet opening and said terminal section exit opening.

5. The temperature probe assembly defined in claim 1, wherein said bleed means is provided with a region of porous material and an exit opening located downstream with respect to said shell member inlet opening, said bleed means establishing a substantially uniform fluid flow velocity with respect to fluid received by the probe assembly through said shell member inlet opening and flowed through said exit opening which is large in comparison to the fluid flow velocity of fluid received by the probe assembly through said shell member inlet opening and flowed through said bleed means porous material.

6. In a probe assembly having a thermocouple junction for detecting the total temperature of an airstream, porous bleed means contacting said thermocouple junction and developing a temperature which corresponds to the total temperature of the airstream sample received by the probe assembly and processed through said porous bleed means.

7. The invention defined by claim 6, wherein said porous bleed means has a surface form which corresponds to the tapering surface portion of a truncated cone and is uniformly and comparatively thin in directions normal to said surface form.

8. The invention defined by claim 7, wherein said porous bleed means has a porosity of approximately thirty percent (30%).

9. The invention defined by claim 7, wherein said porous bleed means is fabricated of sheet-like metal having a multiplicity of uniformly spaced perforations provided therein.

10. A total temperature probe assembly comprised of: a shell member having an inlet opening and a converging-diverging throat means located downstream of said inlet opening, a porous bleed means contained within said shell member and located in aligned relation with said inlet opening and intermediate said inlet opening and said throat means, and thermocouple junction means connected to said porous bleed means in temperature-sensing relation at a downstream surface thereof, said throat means and said porous bleed means establishing three-dimensional fluid flow free of normal shock systems within said shell member as to fluid received through said inlet opening.

11. The probe defined in claim 10, wherein said porous bleed means comprises a perforated hollow frustrum of a right cone having high thermal conductivity.

12. A temperature probe assembly for measuring the total temperature of an airstream sample and which includes, in combination: a shell member having an inlet opening, a bleed member of porous material having the form of a hollow frustrum of a cone and having an inlet opening which corresponds to said shell member inlet opening and an exit opening which is substantially smaller than said inlet opening, and thermocouple temperature-sensing means operatively contacting said bleed member, porous material, said bleed member and said shell member establishing uniform suction through said bleed member porous material and establishing three-dimensional fluid flow within the envelope of said shell member to develop a temperature for said bleed member porous material which corresponds to the total temperature of the airstream sample.

13. A total temperature probe assembly which includes: a shell member having an inlet opening for obtaining a fluid stream sample, a uniformly thin hollow frusto-conical porous bleed member positioned within said shell member in cooperating aligned relation with said inlet opening, thermocouple means attached to said bleed member at one surface thereof, and terminating means joined to said bleed member to control the flow of a sampled fluid therethrough, said terminating means having a hollow frusto-conical shape and an exit opening provided in the downstream end thereof, said terminating means and said porous bleed member establishing a substantially uniform flow velocity with respect to sample fluid flowed along the longitudinal axes of said bleed member and said terminating means to said exit opening.

14. A method of detecting the total temperature of an airstream with a temperature-sensing means, and which includes the steps of: flowing a portion of said airstream in a direction generally along a surface of said temperature-sensing means at a comparatively uniform velocity, flowing a part of said airstream portion through said temperature-sensing means in a direction generally normal to said temperature-sensing means surface and at a velocity which is small in comparison to said uniform velocity, and detecting the temperature of said temperature-sensing means to thereby detect the total temperature of said airstream.

References Cited in the file of this patent

UNITED STATES PATENTS

| | | |
|---|---|---|
| 2,922,305 | Wehrman | Jan. 26, 1960 |
| 2,931,227 | Werner et al. | Apr. 5, 1960 |
| 2,970,475 | Werner | Feb. 7, 1961 |